(12) United States Patent
Kimura et al.

(10) Patent No.: US 10,635,283 B2
(45) Date of Patent: Apr. 28, 2020

(54) IMAGE FORMING APPARATUS

(71) Applicant: KYOCERA Document Solutions Inc., Osaka-shi, Osaka (JP)

(72) Inventors: Atsushi Kimura, Osaka (JP); Muneki Yamada, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 249 days.

(21) Appl. No.: 15/300,297

(22) PCT Filed: Mar. 27, 2015

(86) PCT No.: PCT/JP2015/059750
§ 371 (c)(1),
(2) Date: Sep. 29, 2016

(87) PCT Pub. No.: WO2015/152084
PCT Pub. Date: Oct. 8, 2015

(65) Prior Publication Data
US 2017/0139580 A1  May 18, 2017

(30) Foreign Application Priority Data
Mar. 31, 2014 (JP) .................... 2014-073744

(51) Int. Cl.
G06F 3/0484 (2013.01)
G06F 1/3234 (2019.01)
H04N 1/00 (2006.01)
B41J 29/38 (2006.01)
B41J 29/42 (2006.01)
G03G 15/00 (2006.01)
(Continued)

(52) U.S. Cl.
CPC .......... G06F 3/04847 (2013.01); B41J 29/38 (2013.01); B41J 29/42 (2013.01);
(Continued)

(58) Field of Classification Search
CPC ............... G06F 3/0482; G06F 3/04847; G06F 3/04842; G06F 3/0484; G06F 3/0481;
(Continued)

(56) References Cited

U.S. PATENT DOCUMENTS

2002/0067515 A1* 6/2002 Abe .................... H04N 1/00204
358/442
2005/0110717 A1* 5/2005 Iwamura ............... G06F 1/3203
345/76
(Continued)

FOREIGN PATENT DOCUMENTS

JP  H11316565 A  11/1999
JP  2006092481 A  4/2006
(Continued)

OTHER PUBLICATIONS

Office Action issued in the counterpart Japanese Patent Application No. 2016-511635 (4 Pages), dated Nov. 14, 2017.

*Primary Examiner* — Tuyetlien T Tran
(74) *Attorney, Agent, or Firm* — Viering, Jentschura & Partner MBB

(57) ABSTRACT

A multi-function peripheral (100) includes a main controller (400) which executes a function in a normal mode and stops in a power-saving mode, a sub-controller (401) which executes a function in the power-saving mode, an accumulation unit (402) which is operable, in the case where setting information for a prescribed setting item is changed in the function executed in the power-saving mode, to accumulate the setting information before and after the change in a prescribed memory (403), and a notification unit (404) which is operable, in response to switching from the power-saving mode to the normal mode, to make notification to a user by displaying the accumulated setting information before and after the change.

2 Claims, 6 Drawing Sheets

(51) Int. Cl.
*G06F 1/3206* (2019.01)
*G06F 3/0481* (2013.01)
*G06F 3/0482* (2013.01)
*G06F 3/0488* (2013.01)

(52) U.S. Cl.
CPC ....... *G03G 15/5016* (2013.01); *G06F 1/3206* (2013.01); *G06F 1/3284* (2013.01); *G06F 3/0481* (2013.01); *H04N 1/00891* (2013.01); *H04N 1/00928* (2013.01); *G06F 3/0482* (2013.01); *G06F 3/0484* (2013.01); *G06F 3/0488* (2013.01); *G06F 3/04842* (2013.01); *H04N 2201/0094* (2013.01); *Y02D 10/159* (2018.01); *Y02D 50/20* (2018.01)

(58) Field of Classification Search
CPC .... G06F 1/3206; G06F 1/3284; G06F 3/0488; Y02D 10/159; Y02D 50/20; H04N 1/00891; H04N 1/00928; H04N 2201/0094
See application file for complete search history.

(56) References Cited

U.S. PATENT DOCUMENTS

| | | | |
|---|---|---|---|
| 2006/0206734 A1* | 9/2006 | Hori | G06F 1/3218 713/300 |
| 2007/0201089 A1* | 8/2007 | Yamamoto | G03G 15/5004 358/1.15 |
| 2008/0198397 A1 | 8/2008 | Watanabe | |
| 2008/0209194 A1* | 8/2008 | Prabakaran | G06F 9/44505 713/1 |
| 2009/0262379 A1* | 10/2009 | Miyake | G03G 15/5004 358/1.13 |
| 2010/0082414 A1* | 4/2010 | Shimaya | G06F 1/3218 705/14.4 |
| 2011/0109613 A1* | 5/2011 | Asai | G06F 1/28 345/211 |
| 2011/0199639 A1* | 8/2011 | Tani | G03G 15/502 358/1.15 |
| 2011/0231686 A1* | 9/2011 | Fujii | G06F 1/3203 713/324 |
| 2012/0099138 A1* | 4/2012 | Hirata | G03G 15/5087 358/1.14 |
| 2012/0154841 A1* | 6/2012 | Sugiura | G03G 15/502 358/1.13 |
| 2013/0019116 A1* | 1/2013 | Ochi | G06F 1/3284 713/323 |
| 2016/0010889 A1* | 1/2016 | Hashimoto | G08C 17/02 700/276 |

FOREIGN PATENT DOCUMENTS

| | | |
|---|---|---|
| JP | 2007174334 A | 7/2007 |
| JP | 2008205714 A | 9/2008 |
| JP | 2010211585 A | 9/2010 |

* cited by examiner

IMAGE FORMING APPARATUS

RELATED APPLICATIONS

The present application is a national stage entry according to 35 U.S.C. § 371 of PCT application No.: PCT/JP2015/059750 filed on Mar. 27, 2015, which claims priority from Japanese application No.: 2014-073744 filed on Mar. 31, 2014 and is incorporated herein by reference in its entirety.

TECHNICAL FIELD

The present invention relates to information display apparatuses and information display methods, and, more particularly, to an information display apparatus and an information display method that can reliably prevent occurrence of an unexpected error due to setting information changed during a power-saving mode.

BACKGROUND ART

Conventionally, there are many techniques related to the power-saving state in printers, copiers, multi-function peripherals, and other information processing apparatuses. For example, Japanese Patent Application Laid-Open No. 2006-92481 (Patent Literature 1) discloses an information processing apparatus which includes a return information generating unit that generates a plurality of types of return information for causing the apparatus to return from a power-saving state to an operating state, a non-volatile storage medium for storing the plurality of types of return information generated by the return information generating unit, a power control unit that controls the power state of the apparatus between the operating state and the power-saving state, and a storing unit that stores return-requested functions and the types of return information in association with each other. In this apparatus, the return information associated with the function for which a return request has been received is identified by referring to the storing unit, and the identified return information is used to cause the apparatus to return to the operating state. The disclosure states that this expedites the return from the energy-saving state such as a hibernation state and ensures improved convenience as well as quick responses to network packets and other requests to the apparatus during the return operation.

Japanese Patent Application Laid-Open No. 2008-205714 (Patent Literature 2) discloses an image forming apparatus which includes at least an operation display function for prompting or accepting a user operation, a printing function of performing printing, a reading function for reading an image of an original, a recording medium for temporarily storing images and information, and a function of controlling the recording medium. The apparatus includes a network unit for communicating with an external apparatus, a user operation detecting unit which detects a particular user operation, and a power-saving control unit which is independently supplied with power and controls a power-saving function of the apparatus. In the power-saving state, the power-saving control unit causes the functions of the apparatus to individually return to the normal power state. The disclosure states that this ensures smooth return from the power-saving state to the normal power state.

CITATION LIST

Patent Literature

Patent Literature 1: Japanese Patent Application Laid-Open No. 2006-92481

Patent Literature 2: Japanese Patent Application Laid-Open No. 2008-205714

SUMMARY OF INVENTION

Technical Problem

In a conventional image forming apparatus, in a power-saving mode, a main controller itself, which is responsible for overall control of the system, is turned off, and a sub-controller, dedicated to the power-saving mode and consuming extremely low power, is up and running instead, for minimizing consumed power. The sub-controller performs control during the power-saving mode in place of the main controller. The main controller and the sub-controller thus work together.

While the sub-controller is running in the normal mode and in the power-saving mode, the main controller is activated in the normal mode. The main controller cannot recognize what operations are being performed during the power-saving mode.

Specifically, in the case where the image forming apparatus returns from the power-saving mode to the normal mode, the main controller is normally activated, linked to the sub-controller, and enters the normal mode. During the power-saving mode, nothing is displayed on an operation panel. Thus, even if a user checks the operation panel immediately after the switching to the normal mode, the user will be unable to confirm any changes externally made to the setting values or any processing performed inside the sub-controller during the power-saving mode. That is, in the normal mode, in response to user operations on the operation panel, settings and/or behaviors corresponding to the operations are displayed and confirmed on the operation panel. On the other hand, in the power-saving mode, no such display is provided on the operation panel, making it difficult for the user to recognize the state of the system at the time when it returns to the normal mode.

The present invention has been accomplished to solve the above-described problems, and an object of the present invention is to provide an information display apparatus and an information display method that can reliably prevent occurrence of an unexpected error due to setting information changed during a power-saving mode.

Solution to Problem

To solve the above-described problems and to achieve the object, an information display apparatus according to the present invention includes a main controller, a sub-controller, an accumulation unit, and a notification unit. The main controller executes a function in a normal mode and stops in a power-saving mode. The sub-controller executes a function in the power-saving mode. The accumulation unit is operable, in a case where setting information for a prescribed setting item is changed in the function executed in the power-saving mode, to accumulate the setting information before and after the change in a prescribed memory. The notification unit is operable, in response to switching from the power-saving mode to the normal mode, to make notification to a user by displaying the accumulated setting information before and after the change.

The present invention can also be configured as an information display method for an information display apparatus including a main controller which executes a function in a normal mode and stops in a power-saving mode and a sub-controller which executes a function in the power-saving mode. The present invention includes the steps of: in a case where setting information for a prescribed setting item is changed in the function executed in the power-saving mode, accumulating the setting information before and after the change in a prescribed memory; and in response to switching from the power-saving mode to the normal mode, making notification to a user by displaying the accumulated setting information before and after the change.

Effects of the Invention

According to the information display apparatus and the information display method of the present invention, it is possible to reliably prevent occurrence of an unexpected error due to the setting information changed during the power-saving mode.

DESCRIPTION OF EMBODIMENTS

An embodiment of an image forming apparatus corresponding to the information display apparatus of the present invention will be described below with reference to the attached drawings, for the understanding of the invention. It should be noted that the following embodiment is an example of an implementation of the present invention and is not intended to limit the technical scope of the invention. Further, the alphabetical letter "S" prefixed to each numeral in the flowchart represents "step".

<Image Forming Apparatus>

Figure 1:
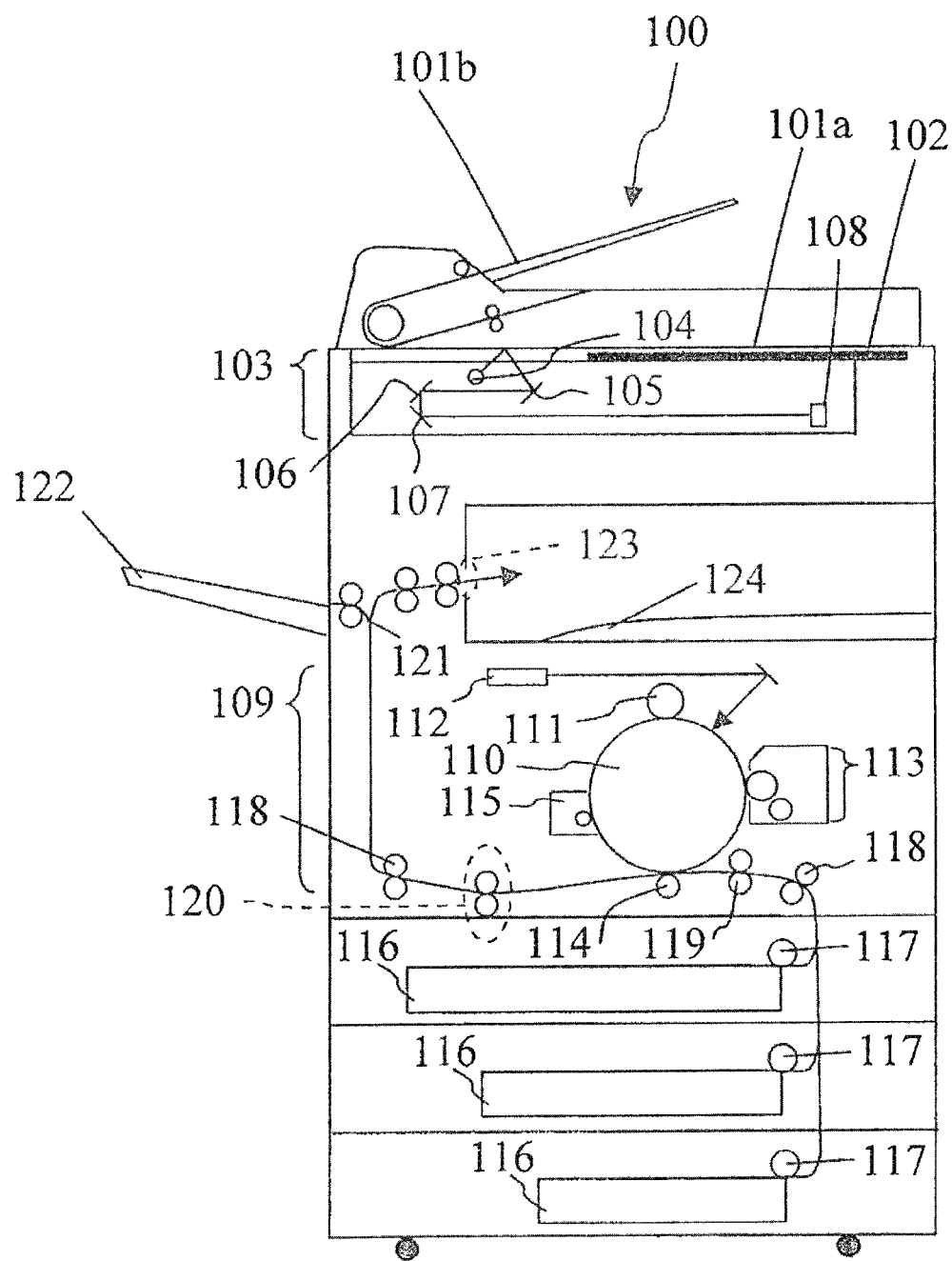
FIG. 1 is a conceptual diagram showing an overall configuration inside a multi-function peripheral according to the present invention.

The image forming apparatus according to an embodiment of the present invention is, for example, a typical image forming apparatus. This image forming apparatus will now be described. FIG. 1 is a schematic diagram of an image forming apparatus according to an embodiment of the present invention, in which details of the portions not directly related to the present invention are omitted.

The image forming apparatus of the present invention is, for example, a stand-alone printer or scanner. Alternatively, it is a multi-function peripheral which includes a printer, copier, scanner, and facsimile machine, and functions as an image forming apparatus having a copying function, scanning function, facsimile function, and printing function.

An operation of a multi-function peripheral (MFP) 100 in the case where its copying function is used, for example, will be described in brief below.

First, when using the multi-function peripheral 100, a user places an original on a platen 101a provided at a top surface of a casing, or on an original table 101b of an automatic document feeder. The user then uses an operation unit 102 (operation panel) provided in the vicinity of the platen 101 to input a setting condition regarding the image forming from an operation screen (initial screen) of the operation unit 102. The multi-function peripheral 100 starts image forming (printing processing) when the user presses a start key arranged in the operation unit 102.

In an image reading unit 103, light emitted from a light source 104 is reflected by the original placed on the platen 101. The reflected light is guided to an image pickup element 108 by mirrors 105, 106, and 107. The guided light is photoelectrically converted by the image pickup element 108, whereby image data corresponding to the original is generated.

An image forming unit 109 is a unit that forms a toner image on the basis of the image data. The image forming unit 109 includes a photoreceptor drum 110. The photoreceptor drum 110 rotates in a prescribed direction at a constant speed. On the periphery of the photoreceptor drum 110, a charging device 111, an exposure unit 112, a developing device 113, a transfer device 114, and a cleaning unit 115 are disposed in this order from the upstream side in the rotational direction of the drum.

The charging device 111 uniformly charges a surface of the photoreceptor drum 110. The exposure unit 112 irradiates the charged surface of the photoreceptor drum 110 with laser light on the basis of the image data, thereby forming an electrostatic latent image. The developing device 114 applies toner onto the thus formed electrostatic latent image to form a toner image. The toner image thus formed is transferred onto a recording medium (paper, sheet, for example) by the transfer device 114. The cleaning unit 115 removes excess toner remaining on the surface of the photoreceptor drum 110. The series of such processes are executed in accordance with the rotation of the photoreceptor drum 110.

The sheet is fed from one of a plurality of paper cassettes 116 disposed in the multi-function peripheral 100. When fed, the sheet is pulled out from a paper cassette 116 onto a transport path by a pickup roller 117. Different paper cassettes 116 store sheets of different types, and a sheet is fed according to a setting condition regarding the image forming.

The sheet pulled out onto the transport path is fed into between the photoreceptor drum 110 and the transfer device 114 by transport rollers 118 and registration rollers 119. The transfer device 114 transfers the toner image onto the sheet thus fed, and the sheet is then transported to a fixing device 120.

As the sheet with the toner image transferred thereon passes between a heating roller and a pressure roller arranged in the fixing device 120, heat and pressure are applied to the toner image, making it affixed to the sheet as a visible image. The heat quantity of the heating roller is set optimally in accordance with the type of paper, ensuring that the fixing is done appropriately. As the image forming is finished with the toner fixed on the sheet as the visible image, the resultant sheet is transported by transport rollers 118 and is discharged via a discharge port 121 onto an internal tray 122 arranged inside the casing. Such sheets are stacked on and stored in the internal tray 122. In the above-described manner, the multi-function peripheral 100 provides the copying function to a user.

Figure 2:
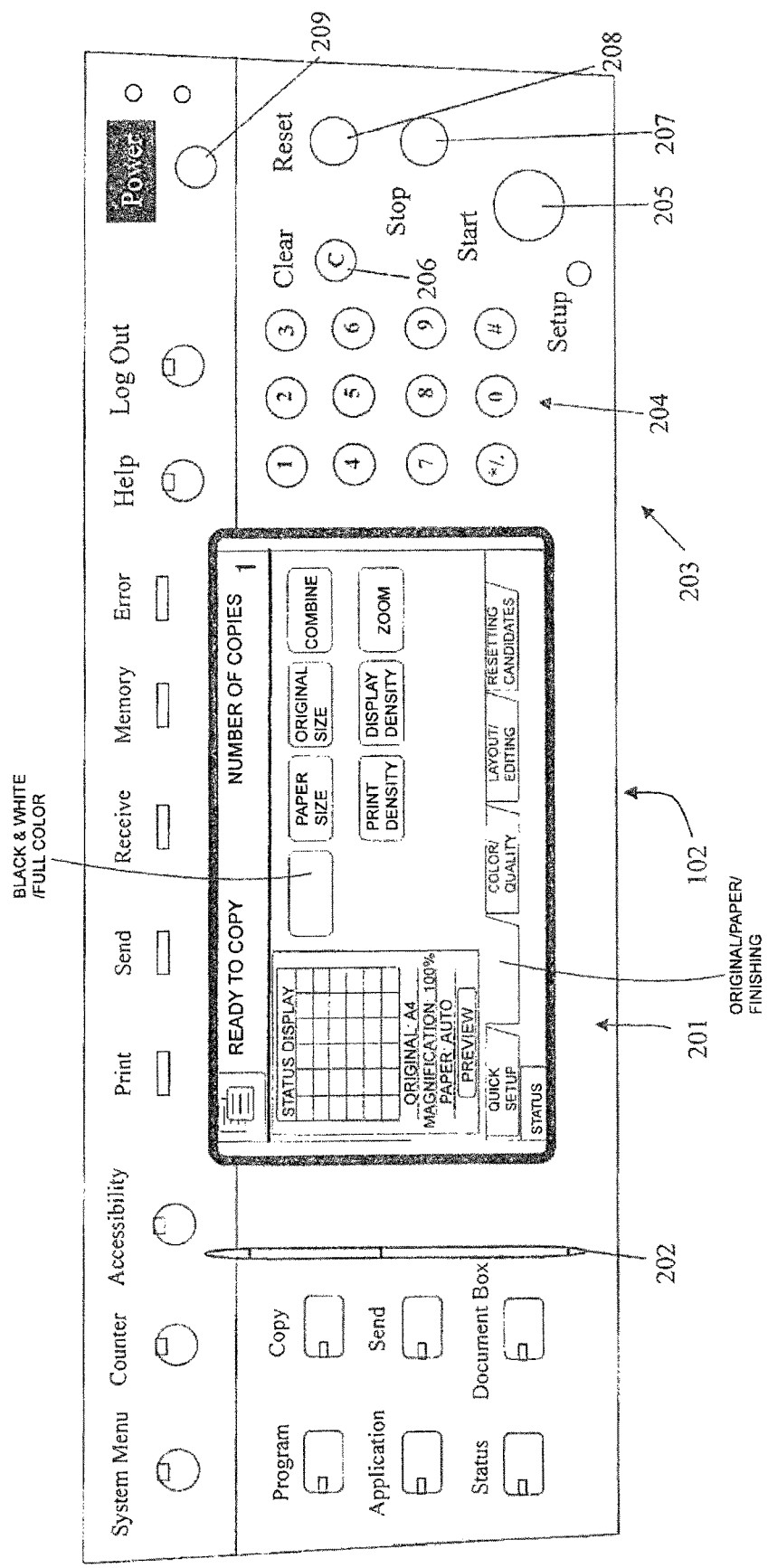
FIG. 2 is a conceptual diagram showing an overall configuration of an operation unit according to the present invention.

FIG. 2 is a conceptual diagram showing an overall configuration of the operation unit according to an embodiment of the present invention. A user uses the operation unit 102 to input setting conditions for the image forming as described above, and to confirm the input setting conditions. For inputting the setting conditions, a touch panel 201 (operation panel), a stylus pen 202, and operation keys 203 provided in the operation unit 102 are used.

The touch panel 201 has both a function of accepting an input of a setting condition and a function of displaying the setting condition. Specifically, as a key on a screen displayed on the touch panel 201 is pressed, a setting condition corresponding to the pressed key is input.

On a back of the touch panel 201, a display unit (not shown) such as a liquid crystal display (LCD) is disposed. The display unit displays, for example, an operation screen such as the initial screen. The stylus pen 202 is arranged in the vicinity of the touch panel 201. As a user brings a tip end of the stylus pen 202 into contact with the touch panel 201, a sensor disposed beneath the touch panel 201 detects the point contacted.

In the vicinity of the touch panel 201, a predetermined number of operation keys 203 are also arranged, which include, for example, a numeric keypad 204, a start key 205, a clear key 206, a stop key 207, a reset key 208, and a power key 209.

Figure 3:
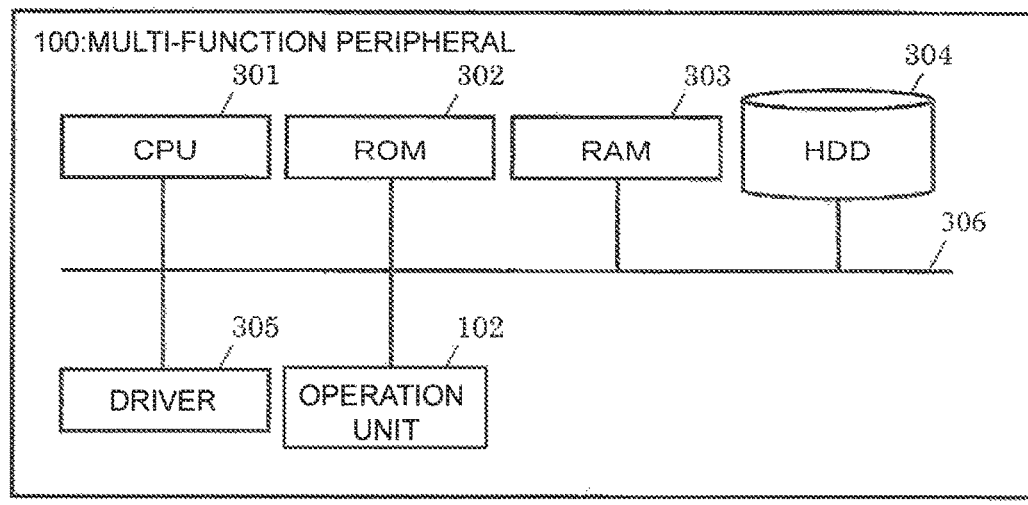
FIG. 3 is a diagram showing a configuration of the controlling hardware of the multi-function peripheral according to the present invention.

A configuration of the controlling hardware of the multi-function peripheral 100 will now be described with reference to FIG. 3. FIG. 3 is a diagram showing a configuration of the controlling hardware of the multi-function peripheral 100 according to the present invention. In the figure, details of the portions not directly related to the present invention are omitted.

A control circuit of the multi-function peripheral 100 includes a central processing unit (CPU) 301, a read only memory (ROM) 302, a random access memory (RAM) 303, a hard disk drive (HDD) 304, drivers 305 corresponding to respective driving units, and the operation unit 102, which are connected via an internal bus 306.

The CPU 301 executes programs stored in the ROM 302, the HDD 304, and the like, using the RAM 303 as a work area, for example. On the basis of the execution results, the CPU 301 communicates data, designations, signals corresponding to the keys, and instructions from the operation unit 102 with the drivers 305, to control the operations of the driving units shown in FIG. 1.

Besides the driving units described above, units (shown in FIG. 4) described below are implemented as the CPU 301 executes programs. The programs and data for implementing the units described below are stored in the ROM 302, the HDD 304, and the like.

EMBODIMENT OF THE PRESENT INVENTION

Figure 4:
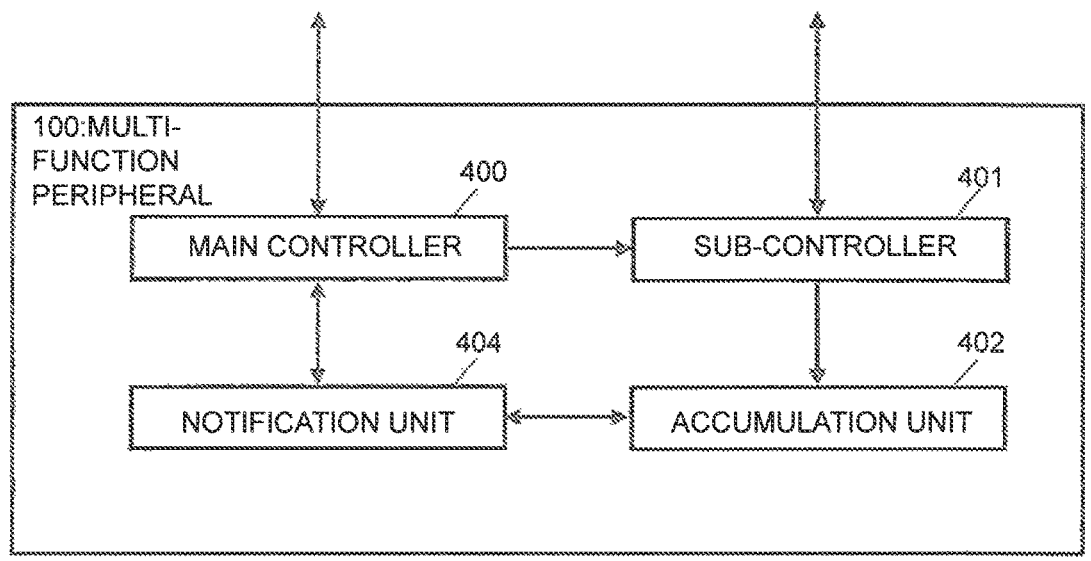
FIG. 4 is a functional block diagram of the multi-function peripheral in an embodiment of the present invention.
Figure 5:
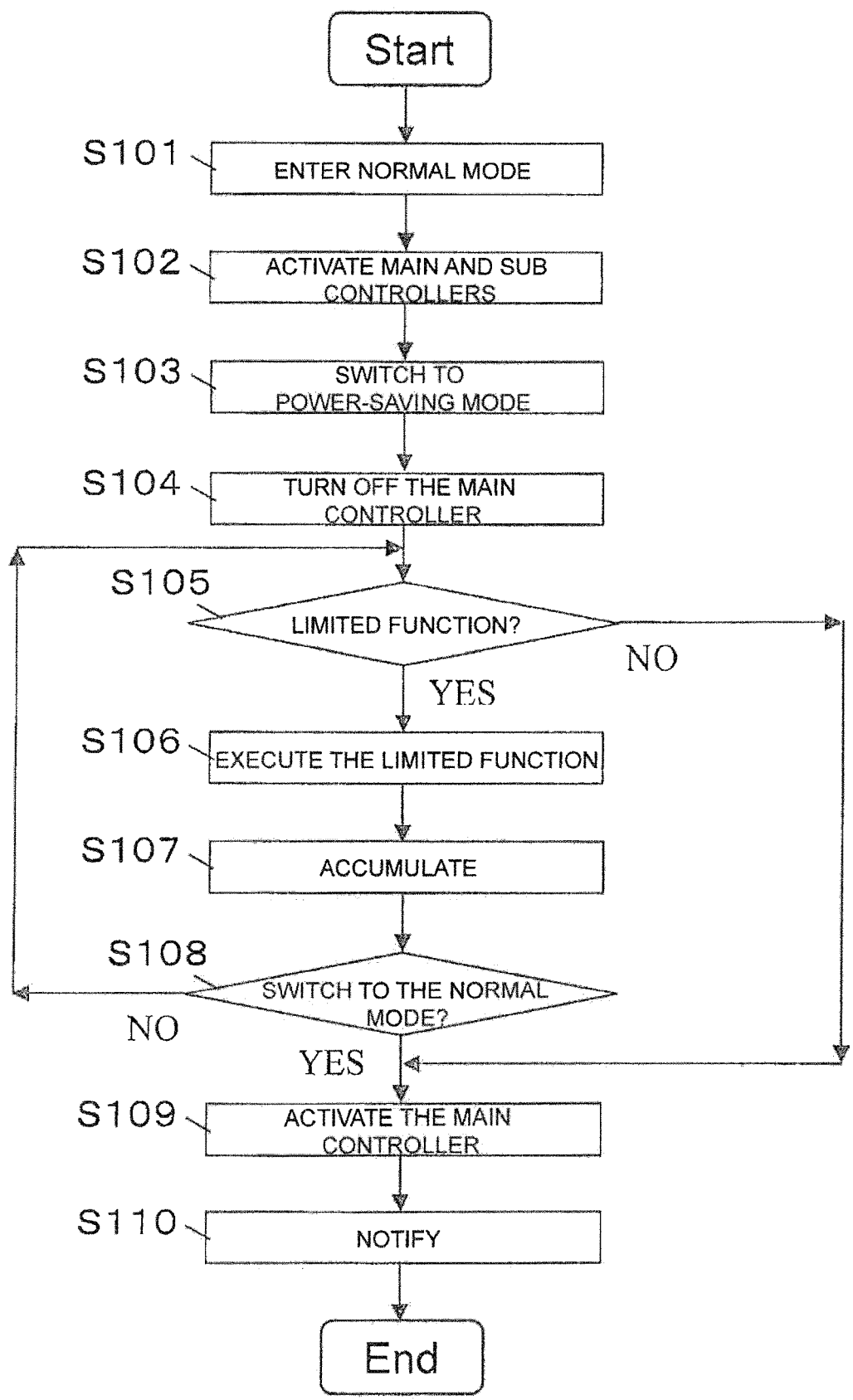
FIG. 5 is a flowchart illustrating execution procedure of the embodiment of the present invention.

A configuration and execution procedure according to an embodiment of the present invention will be described below with reference to FIGS. 4 and 5. FIG. 4 is a functional block diagram of the multi-function peripheral of the present invention. FIG. 5 is a flowchart illustrating the execution procedure of the present invention.

The multi-function peripheral 100 offers both a normal mode, which is a state capable of providing copying and other functions, and a power-saving mode, which is a state consuming less power and capable of providing only facsimile-receiving and other limited functions. The multi-function peripheral 100 includes a main controller for the normal mode and a sub-controller for the power-saving mode.

When the multi-function peripheral 100 is turned on, the main controller and the sub-controller of the multi-function peripheral 100 are activated. The multi-function peripheral 100 enters the normal mode, in which the main controller primarily controls the units.

When the multi-function peripheral 100 is switched from the normal mode to the power-saving mode, power to the main controller is shut off, and the sub-controller being up and running controls the units in place of the main controller.

Although the functions that the sub-controller can support are limited to, for example, a facsimile-receiving function and some other functions, when a processing request is externally transmitted to the multi-function peripheral 100, the sub-controller can control the corresponding units to cope with the request in the same manner as in the normal mode.

The limited functions that the sub-controller can support during the power-saving mode specifically include: changing settings (change of IP address, On/Off of DHCP, etc.) concerning a network function and restarting; changing, referring to, and updating setting values (authentication information, user information, user authorization setting information, etc.) of the internal system of the multi-function peripheral 100; and making various settings for the paper cassettes 116.

When a function (printing function or the like) that the sub-controller cannot support is designated to the multi-function peripheral 100 during the power-saving mode, the sub-controller activates the main controller (to make it resume operation), and the main controller in turn offers the function corresponding to the designation to thereby implement the required processing.

During the normal mode, the sub-controller operates as a duplicate of the main controller. The controllers communicate with each other for synchronization of the processes (controls, behaviors), while the sub-controller performs processing similarly to the main controller.

During the power-saving mode, although the sub-controller performs the limited functions that it can support in place of the main controller, the sub-controller cannot communicate with the main controller which is inactive. This means that the limited function(s) executed during the power-saving mode is/are performed by and completed in the sub-controller, with the main controller being unaware of the content of execution of the limited function(s). Thus, when the sub-controller executes a limited function, it accumulates the content of execution of the limited function as history information.

After the sub-controller accumulates the history information, when the multi-function peripheral 100 is switched to the normal mode, the main controller that has resumed operation communicates with the sub-controller to acquire the history information. The main controller recognizes the content of execution of the limited function(s) performed in the power-saving mode, and reflects the history information in the internal system.

Here, the process of reflecting the history information in the internal system performed by the main controller is generally an internal process, which is not notified to an external user. When a user is to use the multi-function peripheral 100 that has returned to the normal mode, if the internal system has been changed according to the history information, the user may use the multi-function peripheral 100 without knowing such a change, which may cause an unexpected error.

For example, if a setting concerning the network function has been changed during the power-saving mode, there may occur an event that a user who has used a network via the multi-function peripheral 100 up to then can unexpectedly no longer use the network via the multi-function peripheral 100. If authentication information has been changed during the power-saving mode, there may occur an event that a user who has used the multi-function peripheral 100 up to then can suddenly no longer use the multi-function peripheral 100.

As such, a user generally has no chance to know the content of execution of the limited function(s) that was/were performed in the power-saving mode. It is difficult for the user to understand the state of the internal system of the multi-function peripheral 100 that has returned to the normal mode.

In view of the foregoing, the present invention has adopted the following configuration. First, when a user turns on the multi-function peripheral 100, the multi-function peripheral 100 enters a normal mode (FIG. 5: S101), and the main controller 400 and the sub-controller 401 are activated (FIG. 5: S102). During the normal mode, the main controller 400 performs control of the units, and the sub-controller 401, as a duplicate, performs control similarly to the main controller 400.

Here, for example in the case where an elapsed time from the beginning of the normal mode has exceeded a predetermined threshold time (for example, sleep time), or in the case where a user inputs an instruction to switch to the power-saving mode, the multi-function peripheral 100 switches to the power-saving mode (FIG. 5: S103), and the power to the main controller 400 is shut off (FIG. 5: S104). During the power-saving mode, the sub-controller 401 performs control of the units, while supporting only the limited functions.

Here, when a prescribed instruction (for example, an instruction to change a setting value "A" of the internal system "authentication information" of the multi-function peripheral 100) is input from a terminal device external to the multi-function peripheral 100, the sub-controller 401 being running determines whether a designated function corresponding to the instruction is one of the limited functions (FIG. 5: S105).

If it is determined that the designated function is the limited function (FIG. 5: YES in S105), the sub-controller 401 performs the limited function; it changes the setting value for the internal system "authentication information" from "A" to "B", for example (FIG. 5: S106).

When the sub-controller 401 performs the limited function, it notifies the accumulation unit 402 to that effect. When the setting information for a prescribed setting item is changed in the limited function performed, the accumulation unit 402 that has been notified accumulates the setting information before and after the change in a prescribed memory 403 (ROM or the like) (FIG. 5: S107).

Figure 6A:
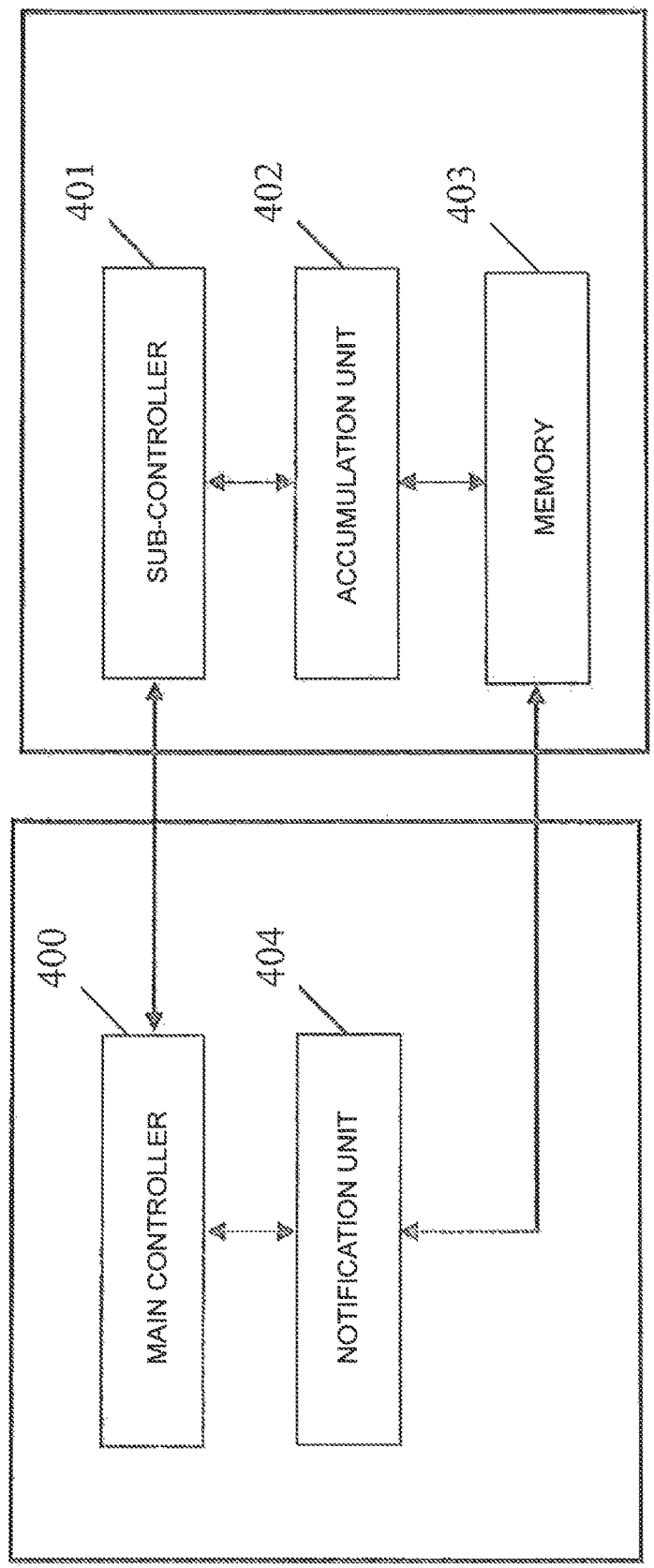
FIG. 6A is a diagram showing a relation between a main controller and a sub-controller in the embodiment of the present invention.

Here, while the setting information may be accumulated by the accumulation unit 402 in any manner, it may be accumulated for example in the following manner. As shown in FIG. 6A, as the sub-controller 401 performs the limited function, the setting value for the internal system "authentication information" as a prescribed setting item is changed from "A" to "B". The accumulation unit 402 acquires the setting information before change (setting value "A") and the setting information after the change (setting value "B") from the sub-controller 401, and accumulates, in the memory 403, the setting information before change (setting value "A") and the setting information after the change (setting value "B") in association with the internal system "authentication information" as the prescribed setting item. In this manner, even in the case where the sub-controller 401 changes prescribed setting information, the setting information before and after the change can be saved as the history information.

After the sub-controller 401 has performed the limited function, if the multi-function peripheral 100 receives no instruction to switch to the normal mode (FIG. 5: NO in S108), the process returns to S105, where the sub-controller 401 alone is running in the power-saving mode.

Here, if the sub-controller 401 further receives an instruction corresponding to one of the limited functions from the outside (FIG. 5: YES in S105), the sub-controller 401 performs the limited function (FIG. 5: S106), and if setting information for a prescribed setting item is changed, the accumulation unit 402 accumulates the setting information before and after the change as appropriate (FIG. 5: S107). It should be noted that in the case where the setting information for the same setting item is changed again, it is preferable that the setting information after the change is updated and accumulated.

On the other hand, in S108, if a user inputs through the operation unit 102 an instruction to switch to the normal mode, the sub-controller 401 accepts the instruction to switch to the normal mode (FIG. 5: YES in S108), and turns on the main controller 400, thereby activating the main controller 400 (FIG. 5: S109).

When the main controller 400 is activated, it notifies a notification unit 404 to that effect. The notification unit 404 that has received the notification refers to the memory 403 to see whether any setting information before and after the change is accumulated in the memory 403. If so, the notification unit 404 displays the accumulated setting information before and after the change, for notification to the user (FIG. 5: S110).

Here, while the notification unit 404 may notify the user in any manner, it may adopt, for example, the following manner. The notification unit 404 acquires, from the memory 403, setting information before and after the change for each setting item. It then displays, on the touch panel 201, a notification screen corresponding to the acquired setting information before and after the change for each setting item.

Figure 6B:
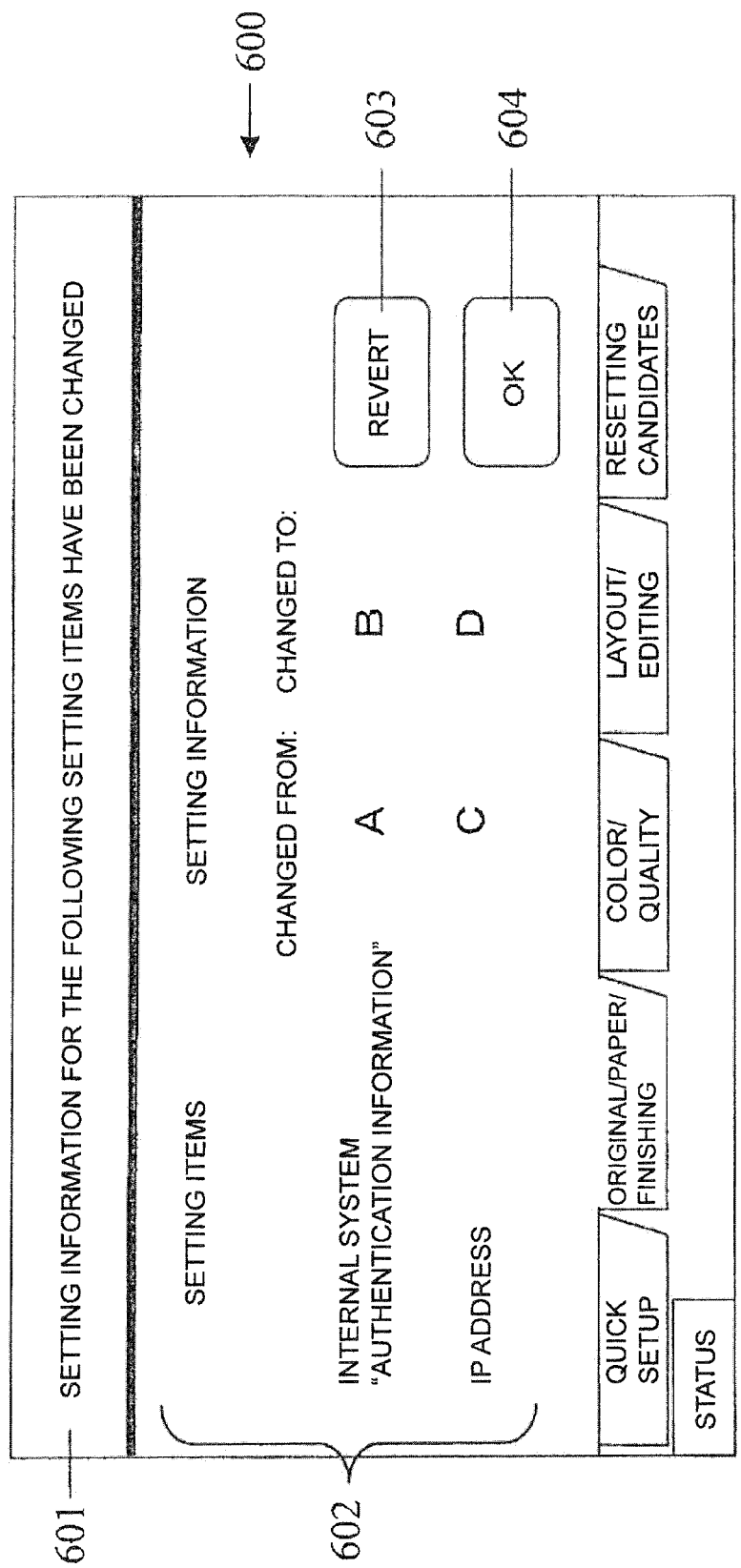
FIG. 6B is a diagram showing an example of a notification screen in the embodiment of the present invention.

On the notification screen 600, as shown in FIG. 6B, a predetermined message "Setting information for the following setting items have been changed" 601, setting information 602 before and after the change for each setting item, a "revert" key 603 for restoring the setting information before the change, and an "OK" key 604 are displayed.

This allows the user to recognize the setting information changed during the power-saving mode, merely at a glance of the notification screen 600.

Here, when the user determines that the setting information 602 before and after the change displayed on the notification screen 600 are appropriate, the user presses the OK key 604. The main controller 400, in response to the depression of the OK key 604, displays a normal operation screen on the touch panel 201.

On the other hand, when the user determines that the setting information 602 before and after the change are inappropriate, the user presses the revert key 603. The main controller 400, by accepting the depression of the revert key 603, changes the setting information after the change back to the setting information before the change, on the basis of the setting information 602 before and after the change. In this manner, the user can avoid any unintended change to the setting information.

Returning to S105, if it is determined that the designated function (printing function, for example) is not one of the limited functions (FIG. 5: NO in S105), the sub-controller 401 turns on the main controller 400, and activates the main controller 400 (FIG. 5: S109) for switching from the power-saving mode to the normal mode. Then, if there is any setting information before and after the change accumulated in the memory 403, the notification unit 404 notifies the user of the accumulated setting information before and after the change (FIG. 5: S110), as described above.

If no setting information before and after the change is accumulated in the memory 403, the notification unit 404 performs nothing particularly, and the main controller 400 displays a normal operation screen on the touch panel 201.

The present invention, as described above, includes: the main controller 400 which executes a function in a normal mode and stops in a power-saving mode; the sub-controller 401 which executes a function in the power-saving mode; the accumulation unit 402 which is operable, in the case where setting information for a prescribed setting item is changed in the function executed in the power-saving mode, to accumulate the setting information before and after the change in the prescribed memory 403; and the notification unit 404 which is operable, in response to switching from the power-saving mode to the normal mode, to make notification to a user by displaying the accumulated setting information before and after the change. This ensures that the user knows the setting information changed during the power-saving mode, making it possible to reliably prevent occurrence of an unexpected error due to the changed setting information. With the setting information before and after the change displayed, the user can readily understand the state of the system when it has returned to the normal mode.

In the embodiment of the present invention, the notification unit 404 has been configured to make notification of all the setting information before and after the change accumulated in the memory 403. The configuration, however, is not limited thereto. For example, while the notification unit 404 may notify of all the setting information before and after the change accumulated in the memory 403, there are a considerable number of pieces of setting information that may be changed in the power-saving mode. For example, setting information changed in the setting item "authentication information" is important to a user, so the user wishes to know the setting information before and after the change whenever it is changed. On the other hand, setting information changed in the setting item "network function" is not important to a user; rather, the user may not be able to understand the information, so the user does not have to recognize the setting information before and after the change. As such, the setting information that a user wishes to know may vary according to the types of the setting items.

Thus, the notification unit 404 may be configured for example as follows. When displaying the accumulated setting information before and after the change, the notification unit 404 compares the setting item corresponding to the setting information before and after the change with a selected item preselected by a user. The notification unit 404 then displays only the setting information before and after the change for the setting item that agrees with the selected item. This ensures that the user is notified of only the setting information that the user wishes to know, while the setting information that is useless for the user to know is prevented from being displayed.

Further, in the embodiment of the present invention, the setting information changed may include one that affects all the users of the multi-function peripheral 100, so the notification unit 404 may be configured as follows. When notifying a user of the accumulated setting information before and after the change, the notification unit 404 compares the setting item corresponding to the setting information before and after the change with a user notification item that has been set in advance to be notified to users. The notification unit 404 then makes notification of the setting information before and after the change for the setting item that agrees with the user notification item, to any user terminal device that corresponds to user notification destination information (mail address, IP address of the terminal device, etc.) registered in advance. This ensures that the user recognizes the important setting information before and after the change.

Some of the users notified of the setting information before and after the change may find such notification unnecessary. Thus, for example, it may be configured such that each user can choose to enable or disable the user notification destination information registered as the notification destination, and the notification unit 404 may be configured to make notification of the setting information before and after the change, to only the user terminal device corresponding to the user notification destination information that has been enabled by the user.

Further, in the embodiment of the present invention, when the sub-controller 401 has changed the setting information for a prescribed setting item, the accumulation unit 402 accumulates the setting information before and after the change, and the notification unit 404 notifies of the setting information before and after the change. The configuration, however, is not limited thereto. For example, in the case where the setting information for a setting item that agrees with a selected item preselected by a user is changed in a limited function executed in the power-saving mode, the accumulation unit 402 may accumulate the setting information before and after the change as a change reservation. That is, at this point in time, the setting information for the setting item corresponding to the selected item preselected by the user has not been changed by the sub-controller 401. Thereafter, when the operation mode is switched to the normal mode, the notification unit 404 notifies the user of the setting information before and after the change corresponding to the change reservation, and inquires whether to change the setting information. Here, if the user inputs an OK key to approve the change, then the notification unit 404 causes the main controller 400 to change the setting information. If the user inputs a cancel key to disapprove the change, then the notification unit 404 refrains from causing the main controller 400 to change the setting information, by nullifying the change reservation. With this configuration, it is possible to reliably prevent occurrence of an unexpected error.

While the sub-controller 401 has been configured to execute only limited functions in the embodiment of the present invention, the sub-controller 401 may execute other functions executed by the main controller 400, besides the limited functions.

Further, in the embodiment of the present invention, it has been configured such that the multi-function peripheral 100 includes the units. Alternatively, it may be configured to provide a storage medium which stores a program that implements the units. In this configuration, the multi-function peripheral 100 is caused to read the program, so that the multi-function peripheral 100 implements the units. In this case, the program itself, read from the recording medium, achieves the functions and effects of the present invention. Furthermore, it is also possible to provide the invention as a method of storing, in a hard disk, the steps executed by the units.

INDUSTRIAL APPLICABILITY

As described above, the information display apparatus and the information display method according to the present invention are useful for apparatuses that include both a main controller and a sub-controller, the apparatuses including a copier, printer, and other apparatuses besides the multi-function peripheral, and are effective as the information display apparatus and the information display method capable of reliably preventing occurrence of an unexpected error due to the setting information changed during the power-saving mode.

What is claimed is:

1. An image forming apparatus having a copying function, scanning function, facsimile function, and printing function, offering a normal mode, which is a state capable of providing the functions, and a power-saving mode, which is a state consuming less power and capable of providing only limited functions including changing of setting values of an internal system of the image forming apparatus and a facsimile-receiving function, and including an image forming unit which forms a toner image and an operation unit comprising:

a CPU which controls the image forming apparatus, wherein
the CPU executes
a main controller which executes the functions in the normal mode and stops in a power-saving mode;
a sub-controller which executes the limited functions in the power-saving mode;
an accumulation unit which is operable, in a case where setting information for a prescribed setting item is changed in the limited functions executed in the power-saving mode, to accumulate the setting information before and after the change in a prescribed memory; and
a notification unit is operable, in response to switching from the power-saving mode to the normal mode, to make notification to a user by displaying the accumulated setting information before and after the change,
if a user inputs through the operation unit and the notification unit accepts an instruction to switch to the normal mode from the power-saving mode, and if the setting information is changed, the notification unit displays a revert key for restoring the setting information before the change and a key for displaying a normal operation screen in addition to the setting information before and after the change,
if the instruction during the power-saving mode is not one of the limited functions, the notification unit executes the main controller, and if the setting information is changed, the notification unit displays the revert key for restoring the setting information before the change and the key for displaying the normal operation screen in addition to the setting information before and after the change, and
if the power-saving mode switches to the normal mode after the sub-controller stores the setting information, the main controller communicates with the sub-controller, acquires the setting information, recognizes the setting information performed in the power-saving mode, and reflects the setting information in the internal system.

2. The image forming apparatus according to claim 1, wherein when displaying the accumulated setting information before and after the change, the notification unit displays only the setting information before and after the change for a setting item that agrees with a selected item preselected by the user.

* * * * *